June 17, 1930. J. E. BELL 1,764,603
WELDED TUBULAR ELEMENT
Filed May 29, 1924
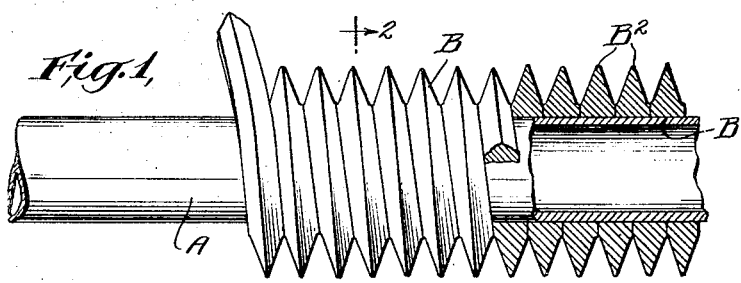
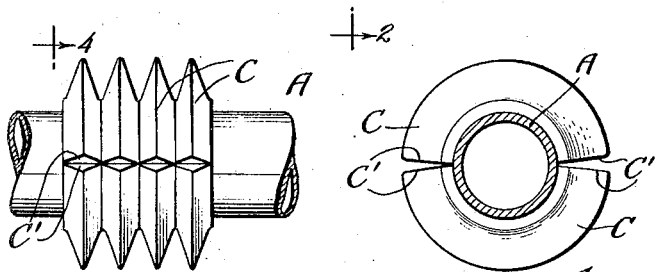
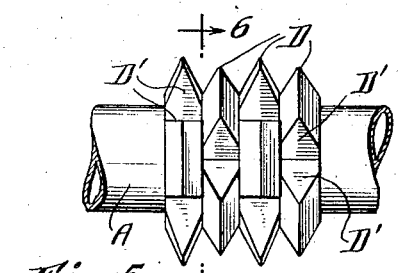
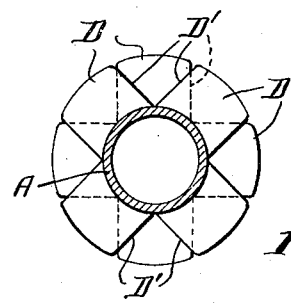
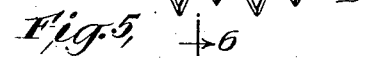
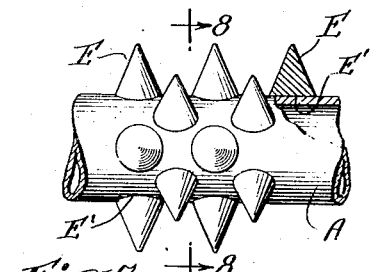
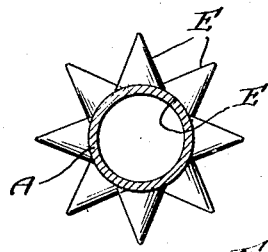
Inventor
John E. Bell
By his Attorney
John E. Hubbell Patented June 17, 1930

1,764,603

UNITED STATES PATENT OFFICE

JOHN E. BELL, OF BROOKLYN, NEW YORK, ASSIGNOR TO FOSTER WHEELER CORPORATION, OF NEW YORK, N. Y., A CORPORATION OF NEW YORK

WELDED TUBULAR ELEMENT

Application filed May 29, 1924. Serial No. 716,591.

My present invention relates to heat transfer apparatus of the kind in which a heat absorbing or dispensing body is provided with external ribs or projections to increase its heat absorbing or dispensing capacity, and the general object of the invention is to provide improved forms of construction of such apparatus characterized by their simplicity and effectiveness and by the facility and relatively low cost of producing such apparatus in the varied forms required for use under different conditions.

The invention is characterized by the formation of the body portion and ribs of each device in separate parts each of which may be made of wrought metal. The invention is especially devised and adapted for use in forming a tubular element of the same general dimensions and heat absorbing surface area as the well known Foster superheater and economizer gilled tube elements. For such use a particular advantage of the invention arises from the fact that the connection between the tube wall and the ribs or projections welded thereto insures good heat conduction between the tube and its ribs or projections, and the latter may be shaped to provide a large amount of heat absorbing surface together with heat conducting properties minimizing the temperature difference between the tube wall and the portions of the ribs and projections most remote therefrom all of which contribute to increase the rate of heat transfer between the fluid within the tube element and the fluid surrounding the element.

The various features of novelty which characterize my invention are pointed out with particularity in the claims annexed to and forming a part of this specification. For a better understanding of the invention, however, its advantages and specific objects attained with it reference should be had to the accompanying drawings and descriptive matter in which I have illustrated and described preferred embodiments of the invention.

Of the drawings:

Fig. 1 is an elevation of a tubular element having a spiral rib welded on the outer surface of the tube wall;

Fig. 2 is a section on the line 2—2 of Fig. 1;

Fig. 3 is an elevation of a portion of a tubular element having segmental ribs welded to the outer surface of the tube;

Fig. 4 is a section on the line 4—4 of Fig. 3;

Fig. 5 is a view taken similarly to Fig. 3 illustrating a construction in which segmental ribs differing in shape from those shown in Figs. 2 and 3 are employed;

Fig. 6 is a section on the line 6—6 of Fig. 5;

Fig. 7 is an elevation partly in section of a tubular element having projections of conical form welded on the tube wall; and Fig. 8 is a section on the line 8—8 of Fig. 7.

In the construction shown in Figs. 1 and 2, A represents the tube body of a tubular element for effecting a transfer of heat between a fluid within and a fluid without the tube, and B is a spiral rib having its inner edge B' welded to the tube A. With a tubular element thus constructed the pitch, thickness, and radial depth of the rib B may be proportioned as required to obtain the desired maximum practical heat transfer capacity under any given condition of use. Advantageously, and as shown in the drawings, the rib B is tapered in cross section to make the area for heat conduction increase as the tube is approached, and the adjacent convolutions are in contact adjacent the tube. As shown, the taper does not extend all the way to the surface of the tube, the cross section of the rib B comprising a rectangular portion adjacent the tube. The finished element may thus have the same general dimensions and the same heat absorbing surface and capacity as the well known gilled Foster superheater and economizer elements, which it resembles in appearance though actually differing therefrom in that the series of circularly extending ribs are not in the form of a set of separate ribs but are formed by the convolutions of a single rib strip bent into the form of a helix of fine pitch.

In the practical construction of the element in Figs. 1 and 2 the rib B will be given the desired cross section by drawing it through suitable die rollers, which deliver it to the tube A and form part of the mechanism for wrapping it snugly about the tube A. In practice I contemplate electrically spot welding the rib B to the tube A as the rib is wrapped in place about the tube. The increase in the heat conductivity of the rib B in a radial direction as the tube is approached, which is due to the tapered form of the rib, obviously minimizes the temperature difference between the outer edge of the rib and the tube wall, and this increases the heat transfer capacity of the apparatus and also reduces the tendency of the outer edge of the rib to burn off when the element is externally exposed to high temperatures.

In the construction shown in Figs. 3 and 4 segmental ribs C are welded to the outer surface of the tube B to form a tubular element similar in configuration to the ordinary Foster gilled tube element except that each segmental rib C, which is in the form of an arc of approximately 180°, cooperates with a rib at the opposite side of the tube to form a practically complete ring about the tube. In this type of construction the end surfaces $C^1$ of the ribs add to the heat absorbing surface of the element. The increase of heat absorbing surface thus produced may advantageously be augmented by increasing the number of segments as shown in Figs. 4 and 5, wherein each segment D is in the form of an arc of approximately 90° and wherein the ends $D^1$ of the ribs add substantially to the total heat absorbing surface of the element.

In the arrangement shown in Figs. 7 and 8 the tube A has welded to its outer surface projections E of conical form, the base surface E' of each projection being cylindrically concave to fit against the tube. With such an arrangement as shown in Figs. 7 and 8 the heating surface of the element may be increased while at the same time the amount of metal in the element may be decreased as compared with the ordinary Foster element, or with the construction shown in Figs. 1 and 2, without impairment of the heat transfer properties of the element. The ribs and projections shown in Figs. 3 to 8 are obviously of a form permitting their ready formation by simple die forging operations.

Having now described my invention, what I claim as new and desire to secure by Letters Patent, is:

1. A tubular heat transfer element comprising a tube and a series of circumferentially extending ribs welded thereto and each tapering in cross section to increase its heat conductivity in a radial direction adjacent the tube, each of said ribs being formed by a plurality of arc shaped segments the end surfaces of which are spaced from the end surfaces of adjacent segments and constitute a substantial portion of the aggregate heat absorbing surface of the element.

2. A tubular heat transfer element comprising a wrought metal tube of circular cross section and a series of circularly extending wrought metal ribs welded thereto, each of said ribs being formed by a plurality of arc shaped segments, and each of said segments consisting of an inner untapered portion adjacent said tube and an outer portion tapering in cross-section to increase its heat conductivity, the adjacent end surfaces of said segments being spaced apart to constitute a substantial portion of the aggregate heat absorbing surface of the element.

Signed at New York city in the county of New York and State of New York this 26th day of May A. D. 1924.

JOHN E. BELL.